United States Patent [19]
Engelstatter et al.

[11] 3,833,834
[45] Sept. 3, 1974

[54] METHOD AND ARRANGEMENT FOR INITIATING A FLASH IN AN ELECTRONIC FLASH UNIT HAVING AUTOMATIC EXPOSURE CONTROL

[75] Inventors: Heinz Engelstatter, Bad Soden; Gotthard Christoph Mahlich, Kronberg/Ts., both of Germany

[73] Assignee: Braun Aktiengesellschaft, Frankfurt, Germany

[22] Filed: Feb. 8, 1973

[21] Appl. No.: 330,872

[30] Foreign Application Priority Data
Feb. 12, 1972  Germany............................ 2206773

[52] U.S. Cl. .......... 315/241 P, 315/159, 315/241 R
[51] Int. Cl. ............................................. H05b 37/00
[58] Field of Search ..... 315/151, 159, 241 P, 241 R

[56] References Cited
UNITED STATES PATENTS

| | | | |
|---|---|---|---|
| 3,519,879 | 7/1970 | Ogawa | 315/151 |
| 3,585,442 | 6/1971 | Krusche et al. | 315/151 |
| 3,727,100 | 4/1973 | Kuraishi et al. | 315/151 |

*Primary Examiner*—Herman Karl Saalbach
*Assistant Examiner*—Lawrence J. Dahl
*Attorney, Agent, or Firm*—Michael S. Striker

[57] ABSTRACT

The operating voltage for the automatic exposure control circuit terminating the flash is furnished from a storage capacitor which in turn is energized from the ignition voltage source upon activation of the flash release contact. A threshold circuit is responsive to the voltage across the storage capacitor and activate the ignition circuit, thereby igniting the flashtube, when the voltage across the capacitor is substantially equal to the operating voltage required for the automatic exposure control circuit.

9 Claims, 2 Drawing Figures

3,833,834

METHOD AND ARRANGEMENT FOR INITIATING A FLASH IN AN ELECTRONIC FLASH UNIT HAVING AUTOMATIC EXPOSURE CONTROL

BACKGROUND OF THE INVENTION

This invention relates to electronic flash units. Specifically, it relates to electronic flash units having a gas discharge tube, an ignition circuit connected to the tube, and an automatic exposure control circuit for terminating the flash when a predetermined quantity of light has been received by the exposure control circuit.

Known electronic flash units of the above-described type operate as follows: After the flash has been initiated, the object to be photographed reflects light into a photosensor which converts the light into a corresponding current. The current is integrated in a capacitor. When the voltage across this capacitor reaches a predetermined voltage which corresponds to the optimum film exposure, the flash is automatically terminated.

If the automatic exposure control arrangement is energized immediately that the operating voltage is applied to the whole electronic flash unit, then the exposure control circuit will react to extraneous light, such as ambient light or light from external flash sources, even prior to the initiation of the flash in the flash unit. Thus additional arrangements must be made to prevent extraneous flashes from operating the automatic control circuit and to prevent errors in the integrator voltage resulting from light impinging on the photosensor prior to initiation of the flash.

In a known flash unit, the above-mentioned errors are prevented by furnishing the operating voltage to the automatic exposure control circuit only when the flash of the unit has been initiated, that is either in dependence upon a current flowing in the ignition circuit of the flashtube or in dependence upon the current flow in the flashtube itself. However, in known units of this type the operating voltage is applied to the automatic exposure control circuit very abruptly. If photosensors of high sensitivity are used, this abrupt application of the operating voltage tends to damage the self-capacitance of these photosensors.

Thus the photosensor is activated by an additional electronic circuit in order to prevent damage to the self-capacitance resulting from rapid changes in the charge applied thereto.

SUMMARY OF THE INVENTION:

It is an object of the present invention to obviate the above disadvantages and to furnish a novel method and arrangement for eliminating the influence of extraneous light on the photosensor.

The present invention resides in a flash unit having flash generating means and control circuit means for automatic exposure control. The control circuit means require an operating voltage. The present invention comprises voltage furnishing means for furnishing a first voltage. It further comprises storage means connected to said control circuit means and switch means interconnected between said voltage furnishing means and said storage means for applying said first voltage to said storage means. When the voltage across said storage means reaches a predetermined voltage, that predetermined voltage constitutes the operating voltage for the automatic control circuit means. Further, in accordance with the present invention threshold means are provided which are responsive to the voltage across the storage means and activate the flash generating means when the voltage across the storage means has a predetermined relationship to said predetermined voltage.

It is seen that in this particular arrangement and in the method corresponding thereto the flash is generated only after the circuits for automatic exposure control is in operating condition. However, the time interval from the time that the circuit is in operating condition and the time that the signal initiating the flash is given is extremely short and is generally about 4 microseconds. This time is less than the shutter opening time of the camera and the ionization time of the gaseous discharge lamp which generally constitutes the flash generating means. (These times are in the order of 10 microseconds.)

Another advantage resulting from the use of a flash unit in accordance with the present invention is that the unit can respond right at the start of the light flash, without any error resulting from an insufficient operating voltage. This is particularly important since the intensity of the light flash towards the beginning is usually strongest and any delay in the response time of the automatic control circuit or any error near the beginning of the light flash leads to considerable exposure errors. Of course the error is the highest when the object to be photographed is the closest to the camera. These errors are of course completely eliminated by the present invention.

It is a further advantage of the present invention that without much additional circuitry a relatively high operating voltage can be applied to the automatic exposure control circuit. Thus larger current amplitudes result from the same light input, enabling the integrating process to be carried out more exactly.

In a preferred embodiment of the present invention the storage means are connected to the voltage furnishing means through the anode-cathode circuit of a thyristor whose gate is connected to the synchroneous release contact.

The threshold circuit of the present invention is constituted in a preferred embodiment of the present invention by a thyristor having its anode-cathode circuit in the ignition circuit and a gate connected to a voltage divider which in turn is connected in parallel with the storage means. In a further preferred embodiment of the present invention the voltage furnishing means are a portion of the means which furnish the ignition voltage for the ignition circuit. This can of course be accomplished by the use of voltage divider means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

Figure 1:
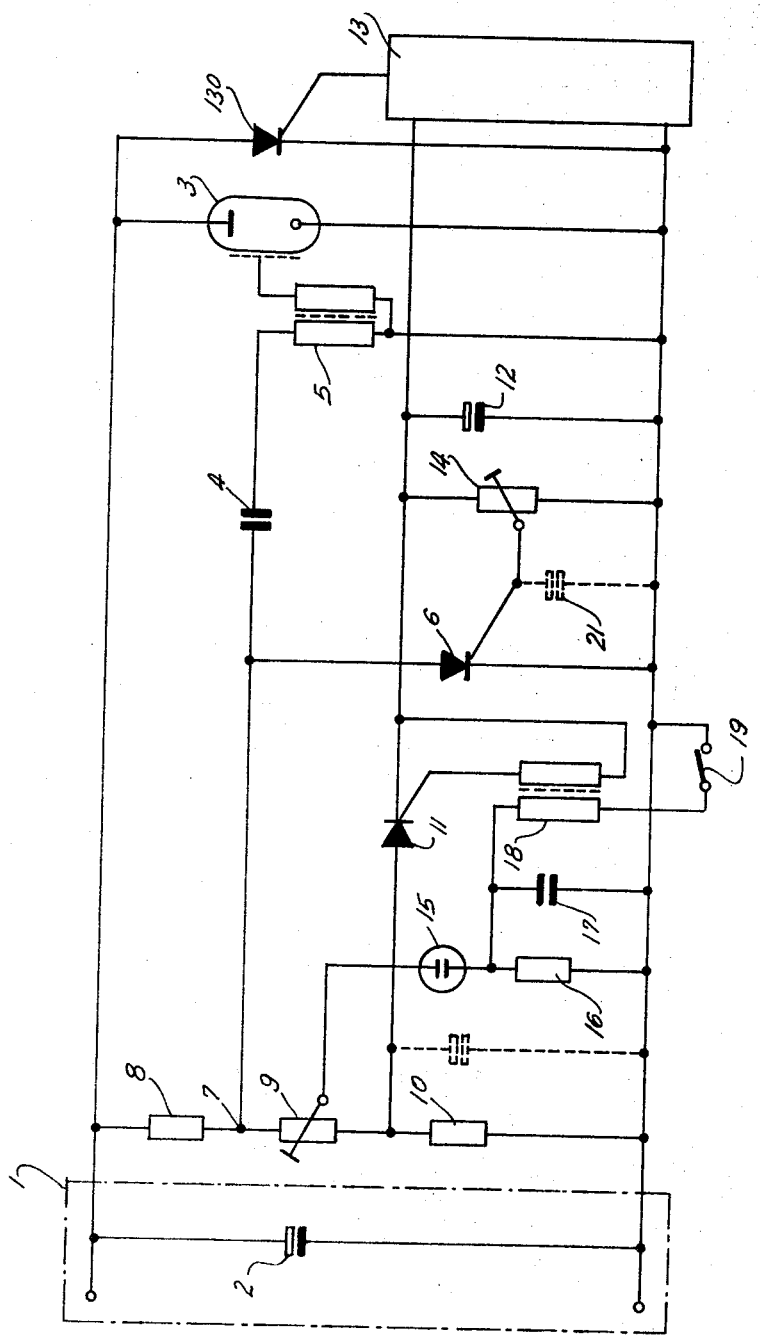
FIG. 1 is a schematic diagram of one embodiment of the present invention.

DESCRIPTION OF THE PREFERRED EMBODIMENTS:

A preferred embodiment of the present invention will now be described with reference to the drawing.

The energy required for the flash is furnished in a unit 1 which comprises a main energy storage capacitor 2. The flashtube, a gaseous discharge lamp 3, is connected in parallel with capacitor 2. The ignition circuit for flashtube 3 comprise an ignition capacitor 4 and an ignition transformer 5. A primary winding of ignition transformer 5 is connected in series with ignition capacitor 4 and the anode-cathode circuit of a thyristor 6 is connected in parallel with the so-formed series combination. Voltage divider means comprising resistors 8,9 and 10 are connected in parallel with capacitor 2. The common point of resistors 8 and 9 is designated by reference numeral 7 and constitutes the point at which the voltage for the ignition circuit is furnished. The common point of resistors 9 and 10 constitutes the point at which the first voltage is furnished. The anode-cathode circuit of a thyristor 11, constituting part of switch means, is connected in series with a capacitor 12 and the so-formed series circuit is connected in parallel with resistor 10. Capacitor 12 constitutes storage means and the voltage across capacitor 12 is the operating voltage for the automatic exposure control circuit 13.

Arrangement 13 is well known in the art and comprises a photosensor which produces a current proportional to the light reflected from the object to be photographed. It further comprises means for integrating this current. When the so-integrated value has reached a predetermined value corresponding to the desired exposure, the flash is terminated. This may occur through the ignition of an element connected in parallel with the gas discharge tube as for example a thyristor 130 as shown in FIG. 1. The internal impedance of the element connected in parallel with the gas discharge lamp is considerably less than that of the gas discharge lamp so that it absorbs most of the energy furnished by capacitor 2, thereby causing the gaseous discharge lamp to be extinguished. Alternatively a quench tube may be used for the same purpose and in the same way. A further alternative is the connection of a switching element such as a thyristor in series with the gas tube and causing this thyristor, which of course is conductive during the flash, to become non-conductive, thereby opening the flashtube circuit.

A potentiometer 14, which serves as a voltage divider means is connected in parallel with capacitor 12. Its variable arm is connected to the gate of a thyristor 6.

Resistor 9 is also a potentiometer. Its wiper arm is connected with a glow lamp 15 which in turn is connected in series with a resistor 16. A capacitor 17 is connected in parallel to resistor 16. The primary winding of a transformer 18 can be connected in parallel with capacitor 17 by the operation of a switch 19. The secondary winding of transformer 18 constitutes the gate-cathode circuit of thyristor 11.

Capacitor 2 charges to the supply voltage after the unit is plugged in. Once the capacitor is fully charged, the glow lamp 15 lights. Capacitor 17 charges to the voltage existing across resistor 16. The flash unit is ready for operation.

If now contact 19, which is the synchronous release contact, is activated, capacitor 17 discharges over the primary winding of transformer 18. This causes a pulse to be generated in the secondary winding of transformer 18, thereby causing thyristor 11 to become conductive. Capacitor 12 now begins to charge. The variable arm of resistor 14 is so adjusted that thyristor 6 only ignites, thereby activating the ignition circuit, and causing the ignition of the gas discharge tube 3, after capacitor 12 has reached a voltage which has a predetermined relationship to the predetermined voltage constituting the operating voltage for the automatic control circuit. Specifically, the circuit is generally arranged so that thyristor 6 only ignites after the operating voltage is fully available for unit 13.

The gas discharge tube 3 remains conductive until the circuit 13 furnishes a pulse to the gate of thyristor 130 which causes this thyristor to become conductive. The thyristor then ignites, terminating the flash. Particularly short time periods for charging capacitor 12 can be achieved by connecting a capacitor 20 (shown in dotted lines in FIG. 1) in parallel with resistor 10. Under these conditions capacitor 12 may charge in less than 1 microsecond.

Capacitor 20 charges simultaneously with capacitor 2 to the voltage existing across resistor 10 and speeds up the charging process of capacitor 12 by its discharge energy. The use of capacitor 20 allows high ohmic values to be used for resistors 8,9 and 10, thus resulting in less load on capacitor 2 and a more efficient system.

It is further possible to substitute a Zener diode for resistor 10. This of course would guarantee that the first voltage is a stable constant voltage, thereby stabilizing the operating voltage of unit 13.

A further capacitor 21, also shown in dotted lines, may be connected from the gate of thyristor 6 to ground. This allows the ignition time for thyristor 6 to be varied which may be of importance in achieving special effect.

Figure 2:
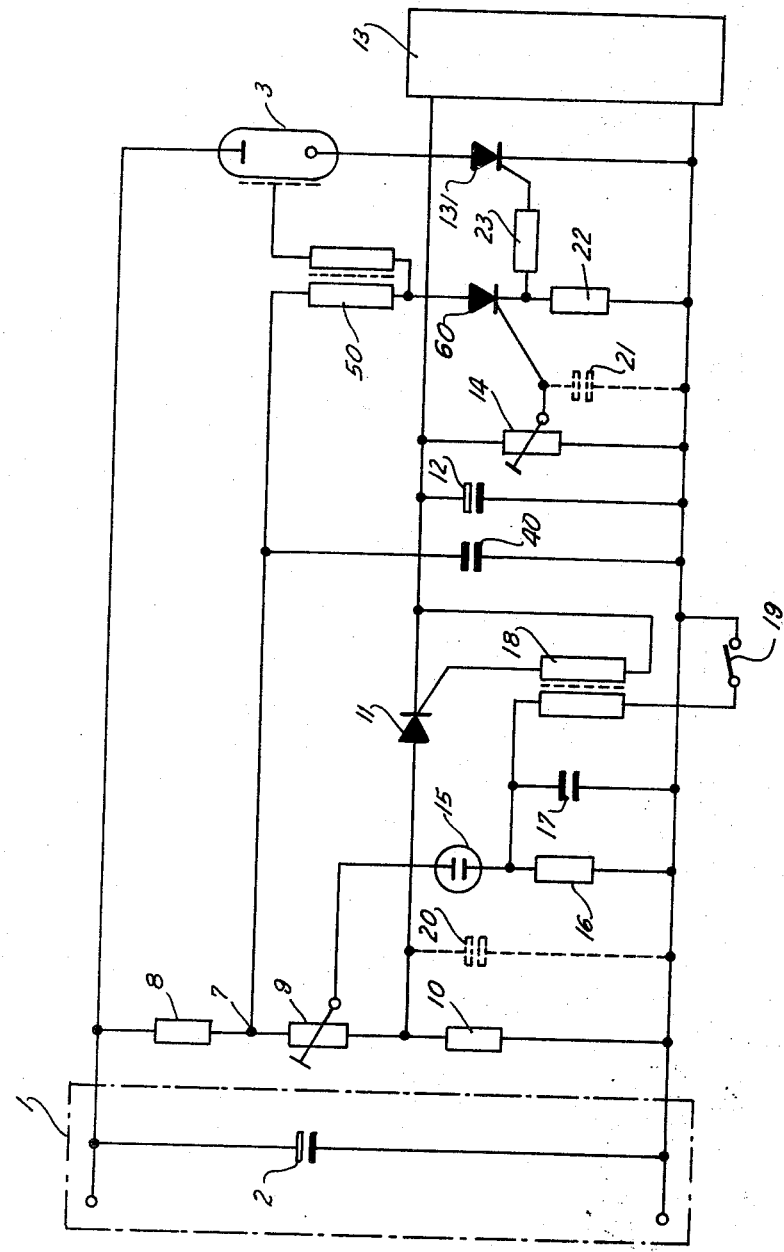
FIG. 2 is an alternate embodiment of the present invention.

The embodiment of the present invention shown in FIG. 2 is substantially the same as that in FIG. 1 except for the arrangement of the elements in the ignition circuit and for the fact that the thyristor terminating the flash is connected in series with the flash tube. The elements which perform the same functions as those of FIG. 1 have the same reference numerals.

As in FIG. 1, the voltage for the ignition circuit is derived from terminal 7 of voltage divider 8,9 and 10. A primary winding of ignition transformer 50 is connected in series with the anode-cathode circuit of thyristor 60 and with a cathode resistor 22. The so-formed series circuit is connected in parallel with ignition capacitor 40. As in FIG. 1, the gate of thyristor 60 is connected with the variable arm of resistor 14. The cathode of thyristor 60 is connected through a limiting resistor 23 to the gate of a thyristor 131 whose anode-cathode circuit is connected in series with flashtube 3.

It will be noted that in the circuit of FIG. 1 the open time of thyristor 6, that is the time during which thyristor 6 is conductive, is determined solely by the discharge time of capacitor 4. Reference to FIG. 2 shows that this is not the case there. Ignition thyristor 60 remains conductive for a longer time because of the current supplied through the secondary winding of transformer 50. Thus the arrangement of FIG. 2 allows use of a smaller capacitor 40 for achieving the same open time of the ignition thyristor.

The open time of the thyristor in the ignition circuit is particularly in important in the arrangement such as shown in FIG. 2, where a thyristor connected in series with a tas tube is used to terminate the flash. Under these conditions thyristor 131 must of course be conductive during the flash. If a thyristor having a short switching time is used, the ionization time of the gas discharge tube may be longer than the switching time of the thyristor connected in series therewith. Therefore at the end of the ionization time the thyristor may have already switched back to its non-conductive state thereby preventing the initiation of a flash.

While the invention has been illustrated and described as embodied in circuits for initiating the flash a predetermined very short time period in the microsecond range following application of the operating voltage to the automatic exposure control circuit, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art fairly constitute essential characteristics of the generic or specific aspects of this invention and, therefore, such adaptations should and are intended to be comprehended within the meaning and range of equivalence of the following claims.

What is claimed as new and desired to be protected by letters Patent is set forth in the appended claims:

1. An electronic flash unit comprising, in combination, voltage furnishing means for furnishing a first voltage following energization of said flash unit; flash generating means connected to said voltage furnishing means for furnishing a flash in response to an ignition signal applied thereto; control circuit means, including a photosensitive element, connected to said flash generating means for automatically terminating said flash when the light falling on said photosensitive element has reached a predetermined light quantity, said control circuit means requiring an operating voltage having at least a determined minimum amplitude for correct operation; storage means connected to said control circuit means in such a manner that the voltage across said storage means constitutes said operating voltage; switch means connected between said storage means and said voltage furnishing means for connecting said voltage furnishing means to said storage means in response to external activation in such a manner that the voltage across said storage means increases at a determined rate to a voltage having at least said determined minimum amplitude; resistor voltage divider means connected in parallel with said storage means and having a tap for furnishing a tap voltage having an amplitude proportional to the amplitude of voltage across said storage means; and threshold circuit means connected to said flash generating means and to said tap of said voltage divider means, for applying said ignition signal to said flash generating means only when tap voltage has an amplitude corresponding to said determined minimum amplitude.

2. An electronic flash unit as set forth in claim 1, wherein said switch means comprise synchronous release contact means, and first thyristor means having a gate connected to said synchronous release contact means and an anode-cathode circuit for connecting said voltage furnishing means to said storage means upon activation of said synchronous release contact means.

3. An electronic flash unit as set forth in claim 1, wherein said flash generating means comprise a flash tube having an ignition electrode, and an ignition circuit connected to said ignition electrode for furnishing said ignition signal to said ignition electrode when activated; and wherein said threshold circuit means comprise second thyristor means having a gate connected to said tap and having an anode-cathode circuit connected to said ignition circuit for activating said ignition circuit when the voltage at said tap has said amplitude corresponding to said determined minimum amplitude.

4. An electronic flash unit as set forth in claim 3, wherein said ignition circuit means comprise ignition capacitor means and ignition transformer means having a primary winding connected in series with said ignition capacitor means; and wherein said anode-cathode circuit of said second thyristor means is connected in parallel with said ignition circuit means.

5. An electronic flash unit as set forth in claim 3, wherein said ignition circuit means comprise ignition transformer means having a primary winding connected in series with said anode-cathode circuit of said second thyristor means, thereby forming a series circuit, and ignition capacitor means connected in parallel with said so-formed series circuit.

6. An electronic flash unit as set forth in claim 3, wherein said ignition circuit means further comprises means for furnishing an ignition voltage to said ignition circuit; and wherein said means for furnishing a first voltage comprises means for furnishing a portion of said ignition voltage to constitute said first voltage.

7. An electronic flash unit as set forth in claim 3, wherein said resistor voltage divider means comprise a potentiometer having a first terminal connected to said storage means, a second terminal connected to said cathode of said second thyristor means and said storage means and a tap connected to said gate of said second thyristor means; further comprising a capacitor connected from said tap to said second terminal of said potentiometer, for delaying the application of said ignition voltage to said flash generating means a determined time interval following the application of said voltage having said determined minimum amplitude to said control circuit means, whereby said control circuit means is operating correctly immediately prior to the furnishing of said flash.

8. An electronic flash unit as set forth in claim 1, further comprising first capacitor means connected in parallel with said first voltage furnishing means.

9. An electronic flash unit as set forth in claim 8, wherein said storage means comprise a storage capacitor.

* * * * *